Figure 1:
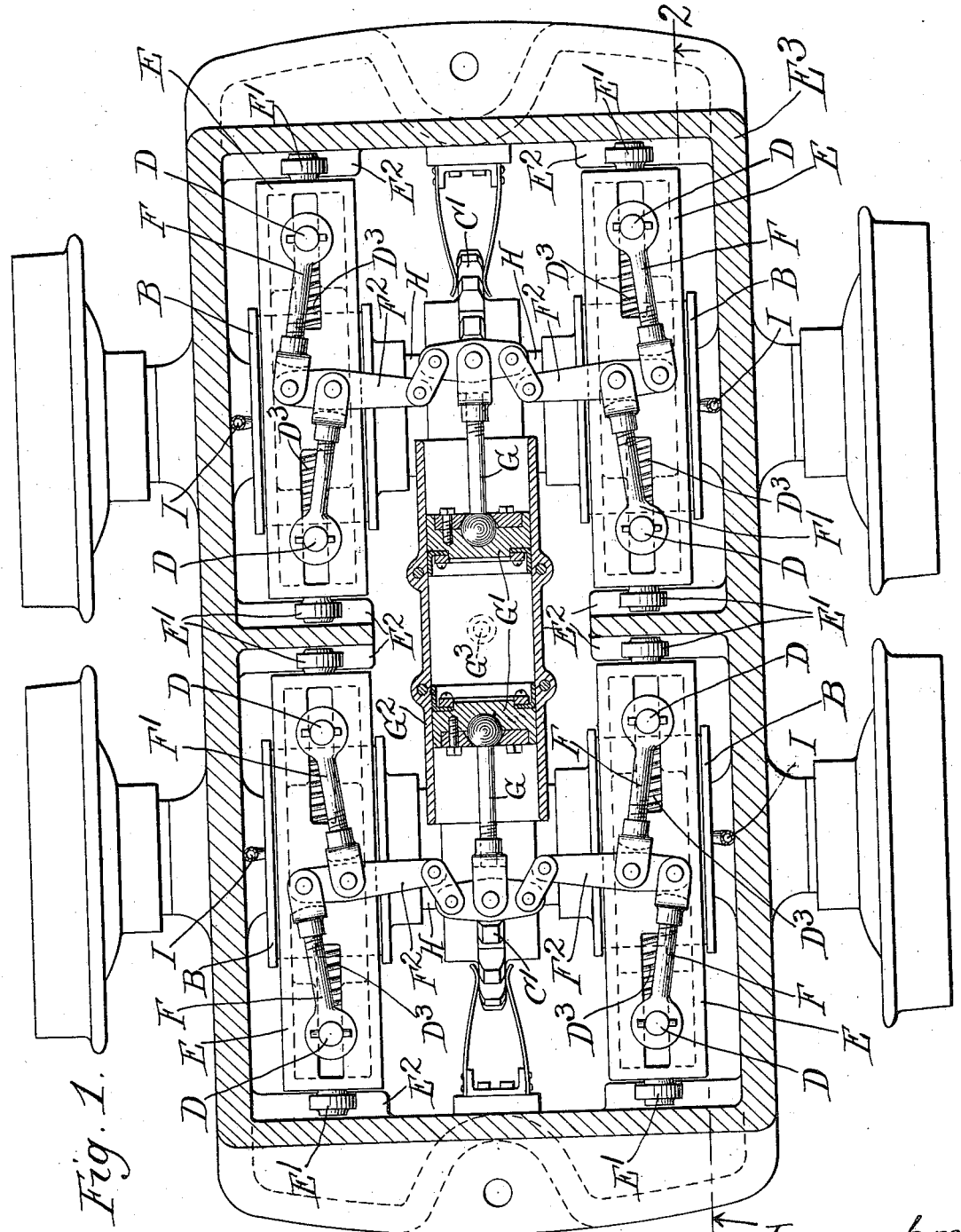

N. D. LEVIN.
RACK RAIL BRAKING CAR.
APPLICATION FILED DEC. 17, 1906.

960,355.

Patented June 7, 1910.
3 SHEETS—SHEET 1.

Witnesses,
Edward T. Wray.
Edna K. Reynolds

Inventor.
Nils D. Levin
by Parker & Carter
Attorneys.

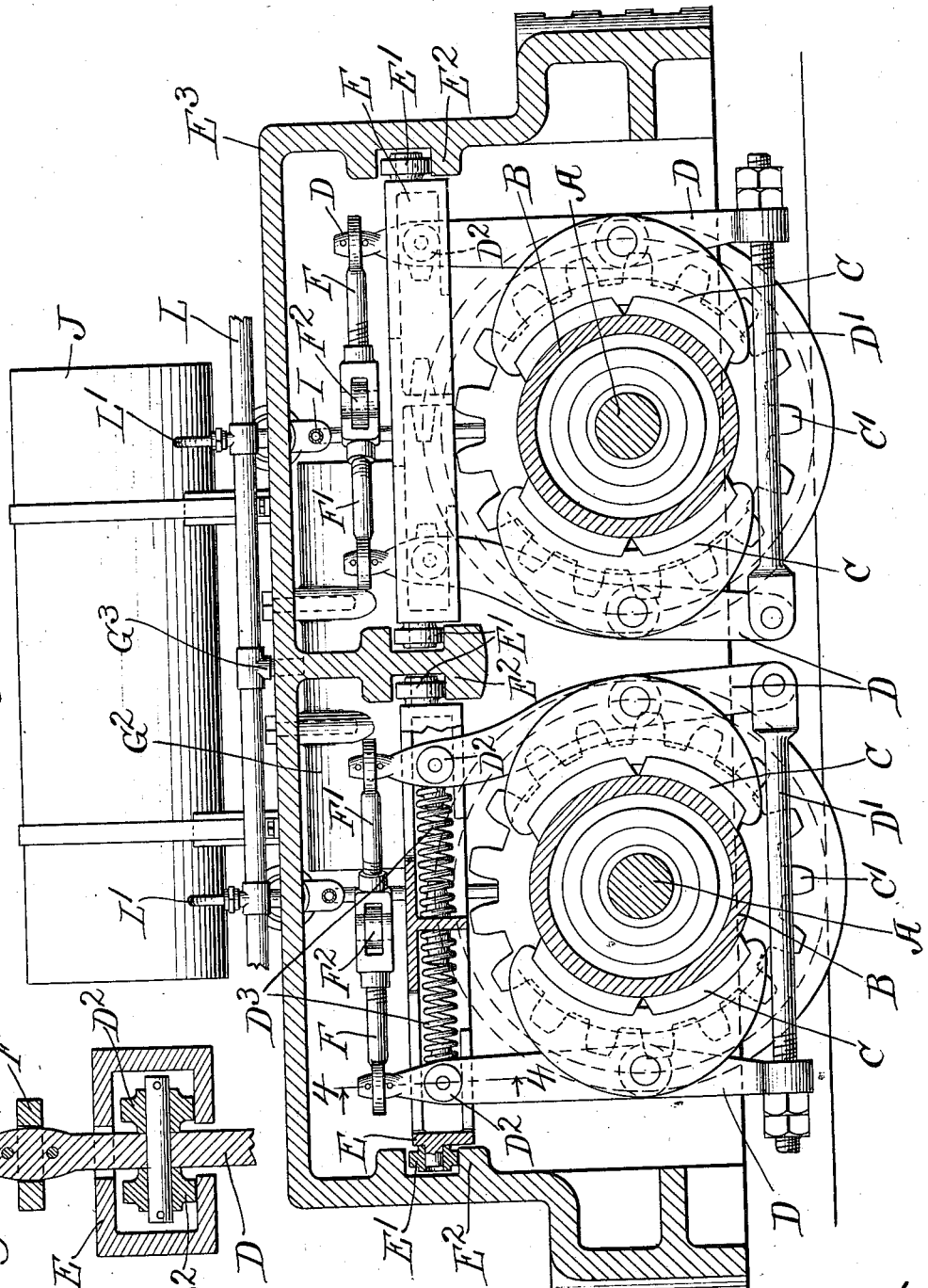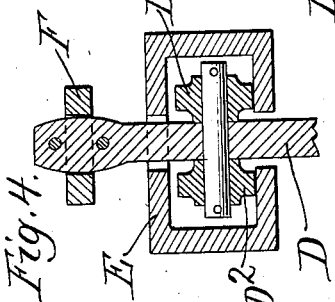

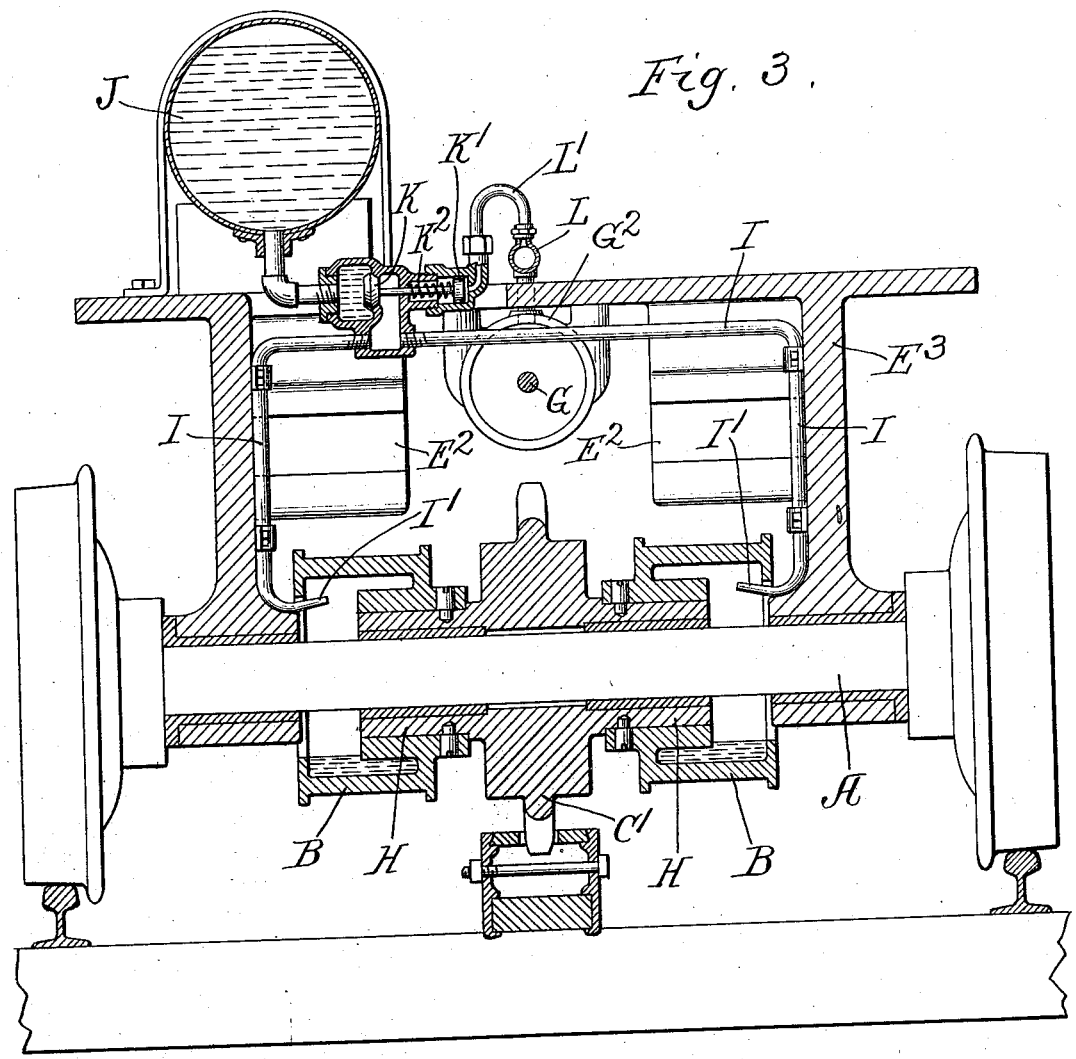

UNITED STATES PATENT OFFICE.

NILS DAVID LEVIN, OF CHICAGO, ILLINOIS, ASSIGNOR TO GOODMAN MANUFACTURING COMPANY, OF CHICAGO, ILLINOIS, A CORPORATION OF ILLINOIS.

RACK-RAIL-BRAKING CAR.

960,355.  Specification of Letters Patent.  Patented June 7, 1910.

Application filed December 17, 1906. Serial No. 348,353.

*To all whom it may concern:*

Be it known that I, NILS D. LEVIN, a citizen of the United States, residing at Chicago, in the county of Cook and State of Illinois, have invented a certain new and useful Improvement in Rack-Rail-Braking Cars, of which the following is a specification.

This invention relates to a rack rail braking car, and has for its object to provide a new and improved car of this description.

The invention is illustrated in the accompanying drawings, wherein—

Figure 1 is a plan view with the top removed showing the braking mechanism; Fig. 2 is a sectional view taken on line 2—2 of Fig. 1; Fig. 3 is a sectional view showing the interior construction; Fig. 4 is a sectional view taken on line 4—4 of Fig. 2.

Like letters refer to like parts throughout the several figures.

The present car is used in connection with rack rail locomotives, and the like, and is provided with braking mechanism by means of which brakes can be applied and the proper retarding effect provided for the locomotive and train of cars attached thereto. As herein illustrated the braking car is provided with the axles A, upon which are mounted the braking elements or braking drums B which are engaged by the braking elements C. The sprocket wheels $C^1$ are mounted upon the same axles as the braking elements B and engage the ordinary rack rail. The braking elements or shoes C are arranged in any desired manner so that they may be forced against the braking elements B. As herein shown there are connected to the braking elements C the braking beams D which are connected together by the connecting links $D^1$. The braking beams D pass through supports E which are preferably mounted upon rollers $E^1$ engaging guides $E^2$ on the frame $E^3$. This permits the braking elements B and the sprocket wheels to have movement in a direction lengthwise of the axle. In view of the fact that the braking elements B and the sprocket wheels are connected together as shown, for example, in Fig. 3, it is necessary that the braking elements B have this movement in order that the sprocket wheels may be kept in alinement to compensate for the irregularities in the rack rail. The brake beams D, as herein shown, pass through openings in the supports E (see Figs. 2 and 4) and are preferably mounted upon rollers $D^2$. The ends of the brake beams are connected with the rods F and $F^1$ which are in turn connected to the links $F^2$. These links are connected with some suitable actuating mechanism so that they may be moved to bring the brake beams toward each other for the purpose of setting the brake. As herein shown these links are connected with the piston rods G attached to the pistons $G^1$ mounted in the cylinder $G^2$. Means is provided for inserting air into the cylinder as, for example, at the point $G^3$ so as to move the pistons outwardly. This movement actuates the links $F^2$ and causes the brake beams to be moved toward each other to clamp the brakes. Between the brake beams D are springs $D^3$ which move them back to their inoperative positions when the pressure of the air in the cylinder is relieved.

The brake elements B may be fastened to the sprocket wheels in any desired manner. As shown, for example, in Fig. 3, the sprocket wheels are provided with hubs H which fit into the brake elements, said elements being attached thereto by any desired means, as, for example, set screws. The brake elements B as shown in this figure are hollow, and there is means associated with them for injecting a cooling fluid such as water into them when the brakes are applied so as to produce a cooling effect. This is secured by means of the pipes I provided with the nozzles $I^1$. Means is provided for automatically producing a flow of the water when the brakes are applied. This may be done in any desired manner. As herein shown a receptacle J is provided for the cooling fluid, and the valve or other device which controls this fluid is controlled by the air as it enters the cylinder $G^2$. This valve is provided with a part K which controls the flow of the water into the pipes I. The valve is provided with another part $K^1$ arranged so as to be affected by the air pressure in the pipe L as it passes to the cylinder $G^2$. This is done by means of the pipe $L^1$. A spring $K^2$ tends normally to keep the valve K closed. When the air is applied to put on the brakes the pressure thereof strikes the part $K^1$ of the valve and causes the valve to move longitudinally to open a communication between the receptacle J and the pipes I. The water then passes through brake elements B. When the pressure of the air is relieved the spring K² moves the valve to its closed position, and the flow of water is stopped. The parts are arranged so that only the proper amount of water is injected into the brake elements.

I claim:

1. A braking device comprising an axle upon which the track wheels are mounted, a sprocket wheel adapted to engage a rack rail and mounted upon said axle, a detachable brake element connected directly with said sprocket wheel so as to revolve therewith, and a second braking element adapted to coöperate with said first brake element.

2. A braking device comprising a sprocket wheel adapted to engage a rack rail, a brake element connected directly with said sprocket wheel so as to revolve therewith, and a second brake element adapted to coöperate with said first brake element, said sprocket wheel and brake elements having a longitudinal movement with relation to the part upon which they are mounted.

3. A braking car comprising a sprocket wheel fixed to the car axle and adapted to engage a rack rail, a brake element connected with said sprocket wheel so as to revolve therewith, a coacting brake element, a support therefor movably mounted upon the car, and means for moving the two brake elements relatively to produce the braking effect.

4. A braking car comprising an axle, a sprocket wheel mounted thereon, a brake wheel on said axle rigidly connected with said sprocket wheel, a brake shoe opposed to said brake wheel, a support for said brake shoe movably mounted upon the car, an actuating mechanism connected with said brake shoe so as to move it into contact with said brake wheel.

5. A braking device comprising a brake wheel, a brake shoe adapted to coöperate therewith, a cylinder, a piston therein, a connection between said piston and said brake shoe, a receptacle carrying cooling fluid, a pipe leading from said receptacle to the brake wheel, a controlling device in said pipe, means for conducting a power fluid to said cylinder to actuate the brakes, the controlling device for the cooling fluid arranged so that said power fluid acts upon it to permit the flow of the cooling fluid.

6. A braking device comprising a sprocket wheel adapted to engage a rack rail, a shaft upon which said sprocket wheel is free to revolve, two brake elements connected directly with said sprocket wheel, one on each side thereof, so as to provide an equal distribution of pressure on each side of the sprocket wheel.

7. A braking device comprising a sprocket wheel adapted to engage a rack rail and having two laterally projecting hubs, two brake elements connected directly with said sprocket wheel and mounted upon said hubs, one on each side thereof, so as to provide an equal distribution of pressure on each side of the sprocket wheel, and two sets of brake shoes associated with each brake element, one on each side thereof, so as to provide a balanced construction.

8. A braking device comprising a sprocket wheel, a braking element fixed thereto, a shaft projecting through said sprocket wheel and braking element, a brake shoe adapted to be forced against said braking element, and means for automatically bringing a cooling fluid into contact with said braking element.

9. A braking car comprising a sprocket wheel adapted to engage a rack rail, a brake element connected with the said sprocket wheel so as to revolve therewith, a coacting brake element having free ends fixed with relation to each other, a support therefor connected with the said brake element near its middle and movably mounted upon the car, and controlling mechanism for moving the two brake elements relatively so as to cause engagement between them.

NILS DAVID LEVIN.

Witnesses:
EDWARD T. WRAY,
DONALD M. CARTER.